(12) United States Patent
Hayden et al.

(10) Patent No.: US 8,145,947 B1
(45) Date of Patent: Mar. 27, 2012

(54) USER CUSTOMIZABLE CVFS NAMESPACE

(75) Inventors: John Hayden, Holliston, MA (US);
Hongliang Tang, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 1101 days.

(21) Appl. No.: 11/537,001

(22) Filed: Sep. 29, 2006

(51) Int. Cl.
*G06F 17/30* (2006.01)
(52) U.S. Cl. .................. 714/20; 714/15; 714/16
(58) Field of Classification Search ............ 714/15, 714/20, 16
See application file for complete search history.

(56) References Cited

U.S. PATENT DOCUMENTS

| | | | |
|---|---|---|---|
| 7,165,186 B1* | 1/2007 | Viswanatham et al. ......... 714/1 |
| 2002/0178146 A1* | 11/2002 | Akella et al. .................. 707/2 |
| 2003/0046307 A1* | 3/2003 | Rivette et al. ............ 707/104.1 |
| 2003/0158863 A1* | 8/2003 | Haskin et al. ................ 707/200 |
| 2003/0182322 A1* | 9/2003 | Manley et al. ............... 707/201 |
| 2004/0030727 A1* | 2/2004 | Armangau et al. ........... 707/200 |
| 2004/0215600 A1* | 10/2004 | Aridor et al. ................... 707/3 |
| 2004/0225648 A1* | 11/2004 | Ransom et al. ................. 707/3 |
| 2005/0050110 A1* | 3/2005 | Sawdon et al. .............. 707/201 |
| 2005/0198081 A1* | 9/2005 | Albert et al. ................. 707/202 |
| 2005/0216462 A1* | 9/2005 | Xiao .............................. 707/8 |
| 2005/0234921 A1* | 10/2005 | King et al. ..................... 707/10 |
| 2006/0036676 A1* | 2/2006 | Cardone et al. .............. 709/203 |
| 2006/0053181 A1* | 3/2006 | Anand et al. ................. 707/204 |
| 2006/0064541 A1* | 3/2006 | Kano ........................... 711/114 |
| 2006/0168473 A1* | 7/2006 | Sahoo et al. ................... 714/15 |
| 2006/0236152 A1* | 10/2006 | Archer et al. .................. 714/16 |
| 2007/0079288 A1* | 4/2007 | Willwerth et al. ............ 717/124 |
| 2007/0192384 A1* | 8/2007 | Shodhan et al. ............. 707/202 |
| 2007/0239804 A1* | 10/2007 | Armstrong et al. .......... 707/204 |
| 2008/0059541 A1* | 3/2008 | Fachan et al. ................ 707/204 |

OTHER PUBLICATIONS

The Elder Geek on Windows XP, "System Restore", Dec. 3, 2003, http://www.theeldergeek.com/system_restore.htm.*

* cited by examiner

*Primary Examiner* — Scott Baderman
*Assistant Examiner* — Chae Ko
(74) *Attorney, Agent, or Firm* — Krishnendu Gupta; William R. Clark; Joseph D'Angelo

(57) ABSTRACT

An apparatus and method are described for defining, maintaining and displaying a checkpoint result set to facilitate identification of desirable checkpoints during system recovery. The checkpoint result set may be mapped to a user-customizable namespace. The user customizes the namespace by selecting one or more characteristics of desirable file system checkpoints. Being able to customize the namespace in this manner enables the user to be provided a more streamlined checkpoint result set in the event of data corruption. As a result an appropriate checkpoint can be more quickly selected for use in recovery.

24 Claims, 6 Drawing Sheets

USER CUSTOMIZABLE CVFS NAMESPACE

FIELD OF THE INVENTION

This invention is related generally to the field of file system checkpoints and more particularly to a user customizable Checkpoint Version File System (CVFS) name space.

BACKGROUND OF THE INVENTION

In network environments where high-availability is a necessity, system administrators are constantly faced with the challenges of preserving data integrity and ensuring availability of critical system components. One critical system component in any computer processing system is its file system. File systems include software programs and data structures which define the use of underlying data storage devices. File systems are responsible for organizing disk sectors into files and directories and keeping track of which sectors belong to which file and which are not being used.

The accuracy and consistency of a file system is necessary to relate applications and data. However, there always exists the potential for data corruption in any computer system and therefore measures are taken to periodically save or back up file server state, to enable system recovery in the event of faults or failures.

Administrators are also looking for ways to recover from user based errors, where users and/or applications logically corrupt or delete files contained in filesystems. Traditionally tape based filesystems backups have met this need, however as the cost of disk continues to fall, more and more of these backup needs are being fulfilled by disk based, online representations of the filesystem that are statically preserved in time. These views can then be examined (for instance the 9 am, 10 am, 11 am views) at the time of loss (say 12 am) and the individual files can be retrieved from the static views and moved to the primary filesystem.

One method for backing up a file system is to collect verified snapshots ('snaps') of a consistent file system, and to store the snaps as file system checkpoints. When data corruption is detected or an object in the filesystem is logically corrupted or lost, one of the checkpoints can be used for file system recovery. Typically the selection of a checkpoint for recovery involves sifting through a list of available checkpoints and selecting one as a basis for recovery.

As the desire for seamless recovery grows, the number of checkpoints that are saved for file systems is increasing. As the number of checkpoints increases the time needed to sort through checkpoint lists becomes a factor in recovery delay.

SUMMARY OF THE INVENTION

According to one aspect of the invention, a method of displaying checkpoint information includes the steps of identifying one or more characteristics of a checkpoint recovery set, filtering checkpoints to generate a result set of recovery checkpoints having one or more of the characteristics, merging this list of checkpoints into the namespace view of the primary filesystem and optionally forwarding the result set of recovery checkpoints to a graphical user interface.

With such an arrangement, network administrators can generate custom views of desired checkpoints by specifying characteristics of a checkpoint recovery set, thereby increasing their ability to quickly select an appropriate checkpoint for use.

DETAILED DESCRIPTION

Figure 1:
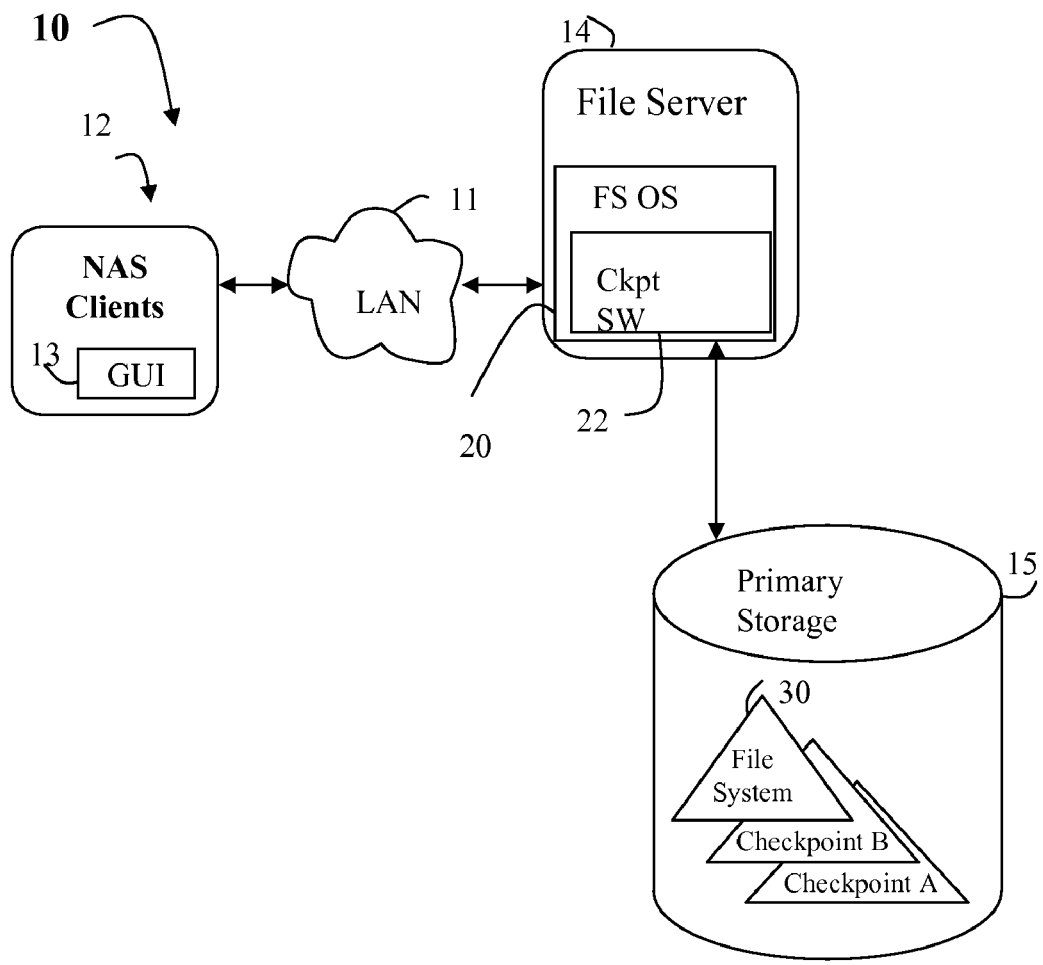
FIG. 1 is a block diagram illustrating several components that may be included in a Network Attached Storage (NAS) system in which the present invention is implemented.
Figure 2:
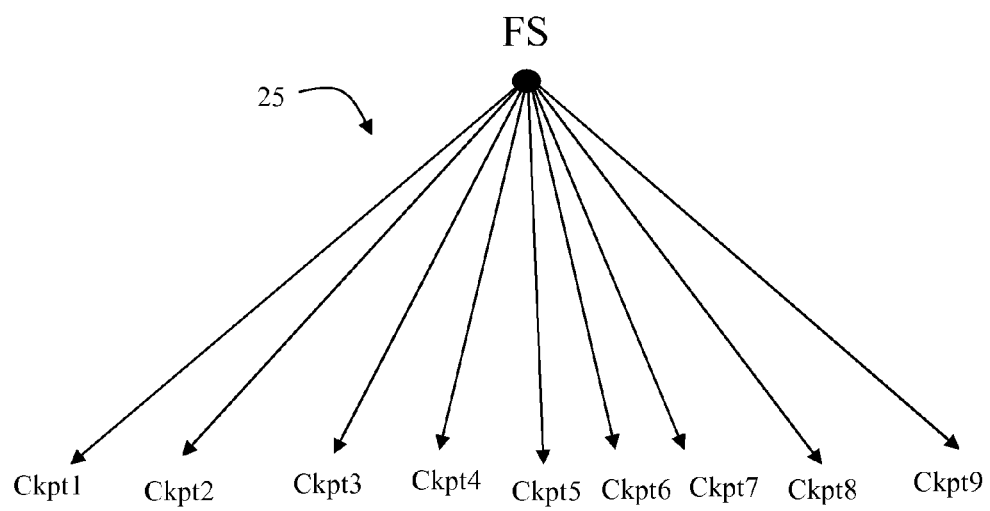
FIG. 2 illustrates a prior art checkpoint namespace.

The present invention is directed towards an apparatus and method for defining, maintaining and displaying a checkpoint result set to facilitate identification of desirable checkpoints during system recovery. The checkpoint result set may be mapped to a user-customizable namespace. The user may customize the namespace using any type of interface, including but not limited to a graphical user interface (GUI), an application program interface (API) and command line code.

The user customizes the namespace by selecting one or more characteristics of desirable file system checkpoints. The characteristics may be absolute; meaning that the membership of the checkpoint in a group associated with the characteristic is known when the checkpoint is generated. An example of an absolute characteristic is organizing the checkpoints in a hierarchal manner according to the fiscal quarter in which they were taken. The characteristic may also be time-indexed, or relative, meaning that the membership of the checkpoint in the group associated with the characteristic is evaluated upon the occurrence of a triggering event. An example of a relative characteristic is organizing the checkpoints in a hierarchal manner according to the amount of time that has elapsed since their creation (for instance 'yesterday, last week, last month, last year, etc.) Being able to customize the namespace in this manner enables the user to be provided a more streamlined checkpoint result set in the event of data corruption. As a result an appropriate checkpoint can be more quickly selected for use in recovery.

In one embodiment a user customizable checkpoint version file system of the present invention is implemented as checkpoint software, a portion of which is associated with and provides an interface to a user, and a portion of which monitors checkpoints and manages directories of the checkpoints in accordance with information provided by the user interface.

An exemplary embodiment of the present invention will be shown and described with reference to the Network Attached Storage (NAS) system 10 of FIG. 1. One or more NAS a client such as client 12 is coupled via a Local Area Network (LAN) 11 to NAS file server 14. File server 14 has its own network address and may be accessed using a variety of network protocols, including but not limited to the Network File System (NFS) protocol of Sun Microsystems™ and the Common Internet File System (CIFS) provided by Microsoft Systems™. An exemplary NAS device that may be used for primary storage 14 is any Celerra product provided by EMC Corporation of Hopkinton Mass.

File server 14 controls the access and retrieval of data from attached storage devices such as primary storage 15. The file server is a computer on which a user can map or mount a drive or directory so that the directory appears to be on the machine at which the user is sitting. Additionally, the user can read or write a file as though it were part of the filesystem of the user's computer.

The filesystem includes program codes and data structures for storing and organizing computer files and the data they contain to make it easy to find and access them. File systems may use a storage device such as a hard disk or CD-ROM and involve maintaining the physical location of the files, they might provide access to data on a file server by acting as clients for a network protocol, A storage system may store one or more snapshots ('snaps'), or 'checkpoints' of the file system. If a failure or a corruption impacts an application's data the application can be re-started using one of the point-in-time checkpoints. The checkpoint may be a clone of the file system, a mirror of the file system or a snapshot of the file system. Both the clone and mirrors of the file system use a large amount of space. However, snap-shots use pointers to the production copy and physically copy only the data that changes, using less capacity than a full clone or mirrored copy. The present invention may work with any type of checkpoint.

As shown in FIG. 1 there may be multiple checkpoints of a file system. Although only three are shown by way of example, it may be that hundreds of checkpoints are available for use during system recovery, and it is an object of the present invention to assist user identification of a desirable checkpoint.

According to one aspect of the invention, the checkpoint software module (CkptSW) 22, executing on file server 14, can build and display a customized view of the available checkpoints and tunnel that customized view of the available checkpoints into the namespace of the primary filesystem. The checkpoints arranged according to the policy of the customized view are organized and presented in the namespace of the primary filesystem—for instance a user navigating in the primary filesystem path /foo/bar, a directory which contains the file 'bat', could navigate into /foo/bar/.ckpt (or whatever virtual directory created by the CVFS infrastructure) and be presented with:

| | |
|---|---|
| /foo/bar/.ckpt/today | [directory] |
| /foo/bar/.ckpt/yesterday | [directory] |
| . . . | |

When the user enters the 'today' directory they would be presented with the checkpoints taken today and within those checkpoints the directory views of /foo/bar that correspond to those snapshots. The exact set of hierarchal names (today, etc.) the policy of arranging checkpoints into these buckets, and the triggers that force reorganization (the passage of time etc.) are defined within the larger context of this invention and are not limited to the examples provided here.

According to another aspect of the invention, a user interface (UI) 13 is shown executing at a NAS client. A checkpoint software module (CkptSW) 22 is shown executing on file server 14. Although the UI and Ckpt SW are shown operating at particular devices in the network, it is appreciated that they may be executed at any type of device, including at policy servers, file servers, attached clients, etc. The UI enables a user to identify checkpoint characteristics that enable the CkptSW to build a hierarchical checkpoint namespace that can be used in the event of data corruption to quickly identify a desirable checkpoint for use during recovery. The UI may be implemented in many forms, including as a graphic user interface with pull down menus, a command-line-interface (CLI), an application programming interface (API), etc., and the present invention is not limited to any particular for of user interface. The UI may include functionality to build the checkpoint namespace as well as a display interface that allows for selective viewing of checkpoints in a checkpoint result set during data recovery.

Figure 3:
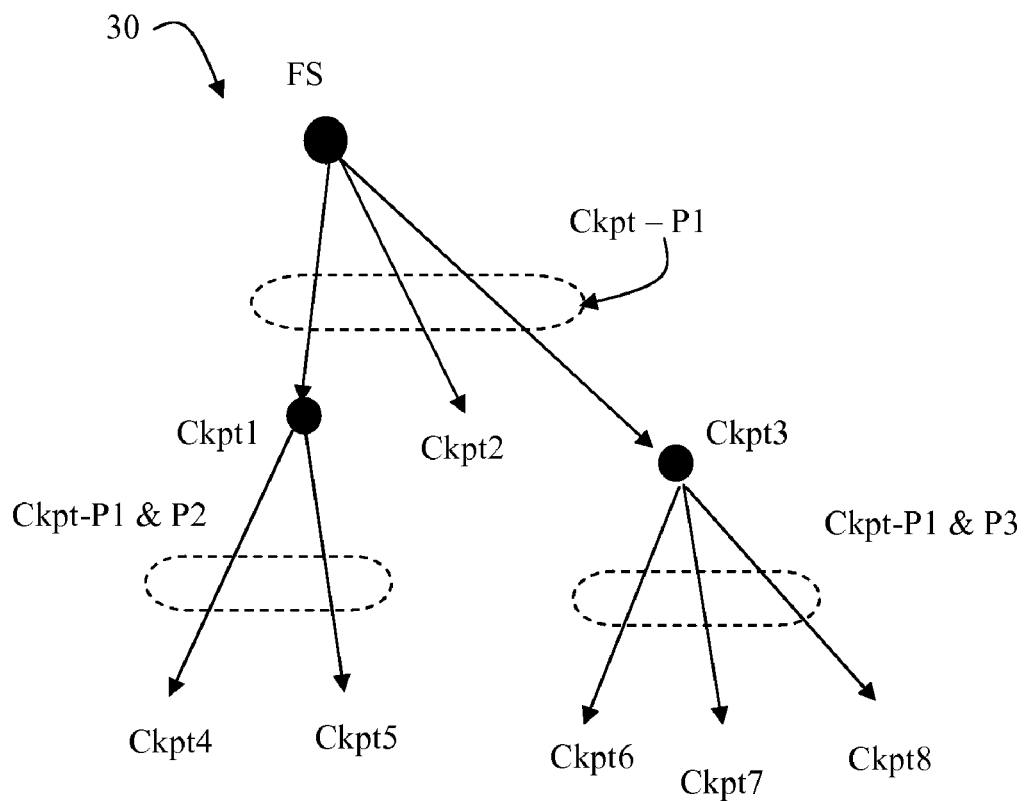
FIG. 3 illustrates a hierarchical checkpoint namespace that may be defined, managed and accessed according to the present invention.

FIG. 3 illustrates a hierarchical checkpoint namespace that may be generated using the mechanisms of the present invention. Many checkpoint snapshots (ckpt1-ckpt8) may be taken of a file system. Organizing the file system checkpoints can be done by specifying characteristics to be used in the organization of this set of checkpoints. By their very nature the checkpoints have a large set of metadata attributes associated with them including but not limited to size, date taken, retention characteristics, parent filesystem, name, etc. Some of the characteristics may have parent/child relationships. For example, characteristic P1 may be a relative characteristic, for all files generated since last week. Characteristic P2 may be an absolute characteristic, identifying all files that are owned by a particular group. Ckpt4 and Ckpt5 are checkpoints that satisfy both P1 and P2 characteristics. Characteristic P3 may be a time relative characteristic of yesterday, having a 'child' relationship to characteristic P1 of 'since last week'. Thus hierarchical name spaces may be defined having any structure. For example, a version created yesterday would be accessible under '.ckpt\yesterday\versionname'. The particular hierarchical namespace structure is a matter of design choice, and the present invention is not limited to any particular hierarchy or combination of absolute and/or relative characteristics in defining the structure.

Figure 4:
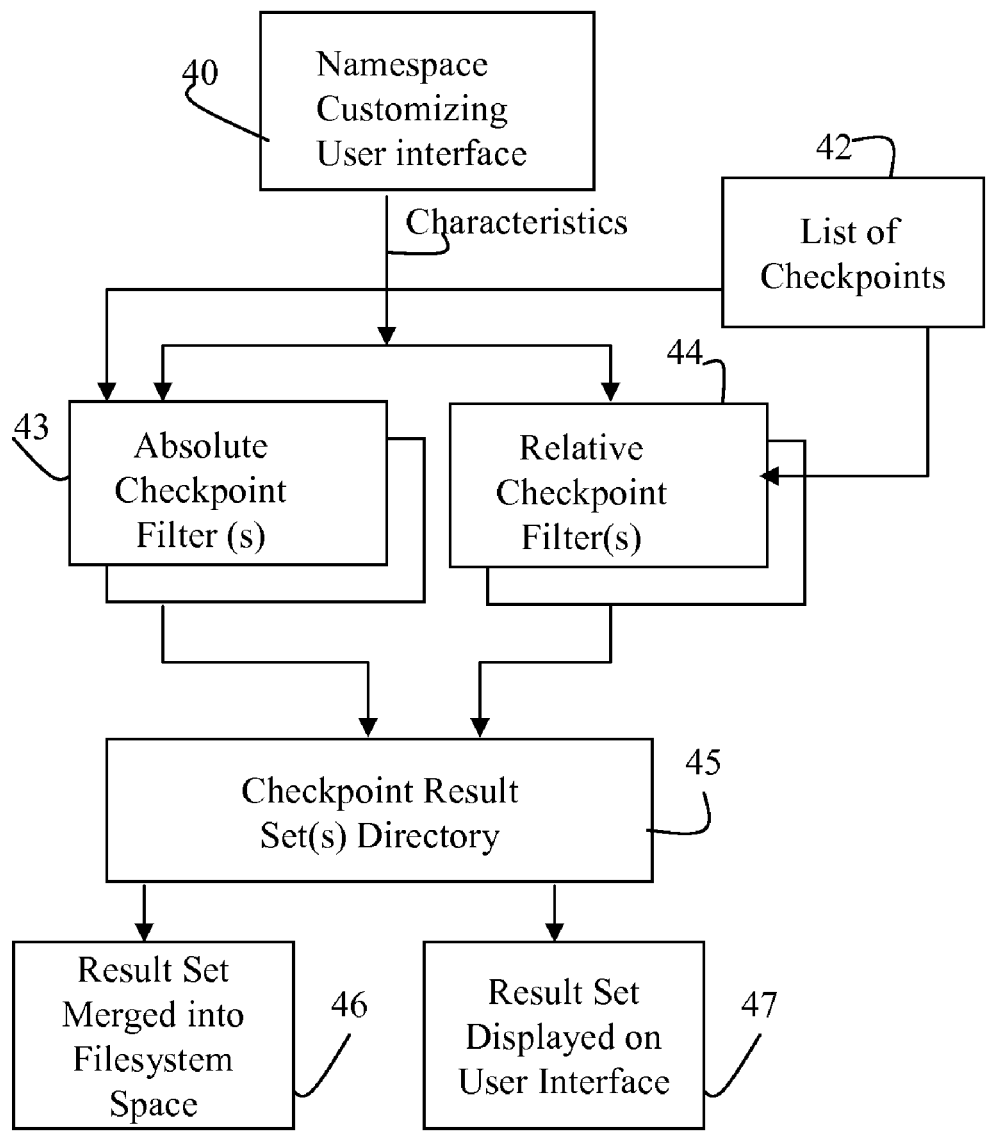
FIG. 4 illustrates several components of checkpoint software of the present invention.

In one embodiment, the characteristics that are input by the user are forwarded to a checkpoint software module, which builds filters and schedules filter operations according to the particular characteristics. FIG. 4 is a block diagram that illustrates several components of an exemplary embodiment of checkpoint software code of the present invention.

The checkpoint software is shown to include a collection of checkpoints, shown in FIG. 4 as checkpoint list 42 which identifies stored checkpoints or links to checkpoints. Each checkpoint is an independent filesystem views. The list is used to dynamically and virtually create a .ckpt directory in every directory of the filesystem on demand when the user requests it.

In a 'flat' checkpoint namespace implementation of the prior art, when a user residing in /foo/bar and attempts to change directory into /foo/bar/.ckpt, a checkpoint directory is automatically, dynamically, created that lists:
/foo/bar/.ckpt/a
/foo/bar/.ckpt/b
. . .

Should the user change directory into /foo/bar/.ckpt/a/ they would receive the directory listing from checkpoint A for the directory /foo/bar in checkpoint A. However, the sorting filters 43 and 44 allow a richer set of more streamlined set of checkpoints to be made available to the user. Using the example above, when a user in /foo/bar requests a checkpoint, the result set may provide the user with the options of:
/foo/bar/.ckpt/yesterday
/foo/bar/.ckpt/yesterday/a
/foo/bar/.ckpt/yesterday/b
/foo/bar/.ckpt/lastweek/c
. . .

The virtual checkpoint hierarchy is built on the fly in memory; it does not really 'exist' on disk, but rather is the application of a policy rule set to the metadata of the checkpoints to create a result set that may then be used to create a virtual directory out of in response to the client request.

The software also includes a namespace customizing user interface 41 by which a user can customize a checkpoint namespace. Absolute checkpoint filters 43 filter checkpoints as they are created to determine whether the checkpoints are members of a checkpoint group having an absolute characteristic. Relative checkpoint filters 44 filters checkpoints from the list 42 upon the occurrence of a triggering event to determine if the checkpoints are members of groups in a relative namespace. The checkpoints identified by filters 43 and 44 are forwarded to a checkpoint result set 45 The checkpoint result set is then nested into the namespace of the primary filesystem 46 via a virtual directory populated with handlers of checkpoints identified by the. NFS and CIFS clients can then navigate to this virtual hierarchy by going into /foo/bar/.ckpt/<virtual namespace according to the sorted view>. The result set may also be forwarded to a display user interface 47 or to the client directly (via a shared folder previous version tab in Windows) to enable a user to view the checkpoint result set and select a desired checkpoint from the checkpoint result set.

Figure 5:
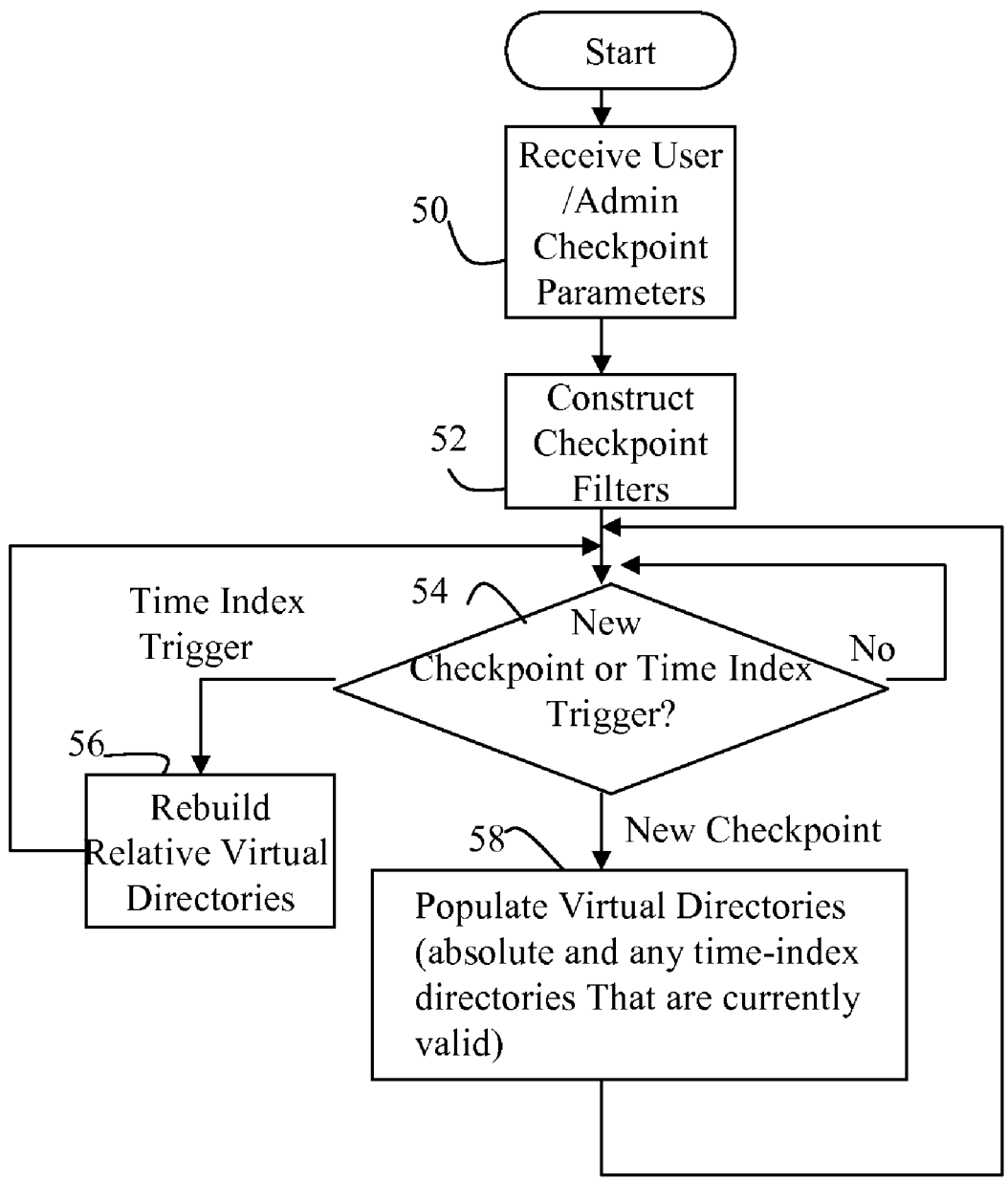
FIG. 5 is a flow diagram illustrating exemplary steps that may be performed for defining filtering characteristics and filtering checkpoints to provide a hierarchical namespace such as that of FIG. 3.
Figure 6:
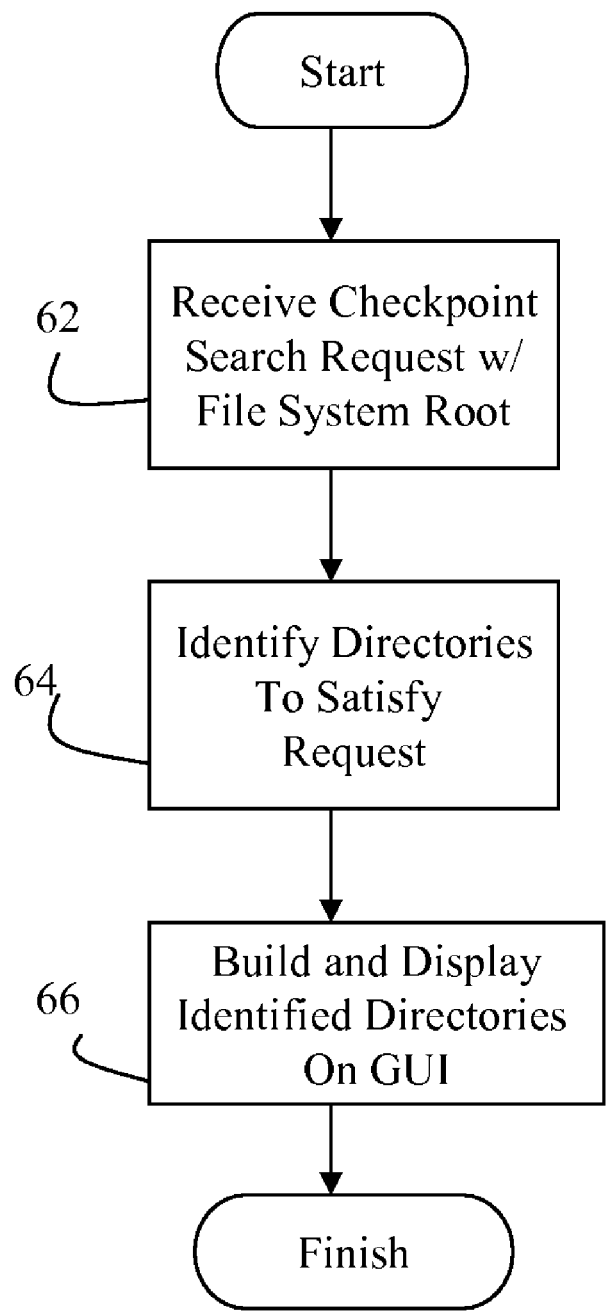
FIG. 6 is a flow diagram illustrating exemplary steps that may be performed to display a hierarchical namespace of checkpoints to an administrator on a graphical user interface.

FIG. 5 is a flow diagram illustrating several exemplary steps that may be performed by checkpoint software of the present invention. At steps 50-52 a user or administrator selects various characteristics of a checkpoint result set. The characteristic may be any characteristic of the file system. In systems where there are more than one file systems, the user may specify different cvfs namespace policies for each of the different file systems. The characteristic may be a simple or complex characteristic. The complex characteristic may be any combination of absolute and relative characteristics. The characteristics may include an offset, a range or other variable. For example, a user may select a time-index characteristic, for a specific file system to index checkpoint results over time. A range of time, granularity of time or time offset may be selected. For example, a user may desire that a result set of checkpoints for a range of ten days should be maintained, at a granularity of ten per day, with this checkpoint result set being generated starting tomorrow.

However the characteristics are identified, at step 52 they are used to build filters that are used to filter checkpoints to determine whether the checkpoints are members of checkpoint groups of interest to the user. A filter may include software code which parses appropriate locations in the file system to determine if the file system is a member of a particular group. At steps 54 and 58, each time that a new checkpoint is generated, absolute filters 43 are executed to determine whether the checkpoint is a member of the group and, if so, to populate the virtual checkpoint result set 45. At step 54 and 56, each time a relative trigger event occurs, the relative virtual directories associated with the relative trigger events are updated. The relative trigger event may include any update to a relative condition. The relative condition may be a time relative condition, a distance relative condition, a security relative condition, or any characteristic of a file system which can be looked on as being dynamic versus a set point. For example, age is a dynamic characteristic. If checkpoints are moved between storage locations it may be that the location of the file system checkpoint is dynamic, in that it may be remote or local, or even organized with respect to the geography in which it resides. In addition a checkpoint may be assigned a priority based on any combination of absolute or relative characteristics, and file system checkpoints may be categorized according to their priority. In such an instance, the change in priority of the file system checkpoint may be the triggering event which causes the checkpoint to be re-categorized. Accordingly it can be seen that there are a variety of methods of identifying relative characteristics and determining events that will cause membership in relative characteristic groups to be re-evaluated, and the present invention is not limited in this manner.

Accordingly a method an apparatus has been shown and described which allows a user to customize the namespace in a file system which contains methods to directly access checkpoint versions of that file system. Having described various embodiments of the invention, it will be appreciated that many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A method of displaying checkpoint information includes the steps of:
    identifying one or more characteristics of a checkpoint recovery set, wherein the checkpoint recovery set includes checkpoints of a primary file system;
    filtering checkpoints to generate a result set of recovery checkpoints having one or more of the characteristics;
    merging the resultant set of recovery checkpoints into a set of virtual directories placed directly within the primary file system; and
    upon the occurrence of a trigger event, updating the virtual directories associated with the trigger event.

2. The method of claim 1 further including the step of forwarding the result set of recovery checkpoints to a display user interface.

3. The method of claim 1 wherein the one or more characteristics includes a complex characteristic.

4. The method of claim 1 wherein the one or more characteristics include at least a pair of hierarchically related characteristics.

5. The method of claim 1 wherein the one or more characteristics includes an absolute characteristic.

6. The method of claim 1 wherein the one or more characteristics include a relative characteristic.

7. The method of claim 6 wherein the relative characteristic is a time relative characteristic.

8. The method of claim 6 wherein the relative characteristic is a distance relative characteristic.

9. The method of claim 1 wherein the characteristic includes a variable.

10. The method of claim 9 wherein the variable specifies an offset.

11. The method of claim 9 wherein the variable specifies a range.

12. The method of claim 1 wherein the step of filtering includes the step of comparing each of the checkpoints to the one or more identified characteristics.

13. The method of claim 12 wherein the step of comparing occurs at checkpoint generation.

14. The method of claim 12 wherein the step of comparing occurs at a triggering event.

15. The method of 14 wherein the triggering event is a time-relative triggering event.

16. The method of claim 14 wherein the triggering event is a distance relative triggering event.

17. The method of claim 1 wherein a graphic user interface including a mechanism for selecting one or more file system characteristics for use in sorting file system checkpoints is used to identify the one or more characteristics of a checkpoint recovery set.

18. The method of claim 17 wherein the mechanism is a pull-down menu.

19. The method of claim 17 wherein the mechanism includes command line language.

20. The method of claim 1 wherein the set of virtual directories are arranged into a virtual checkpoint hierarchy.

21. A computer device including computer readable storage having program code stored thereon, the program code including:
    filtering code for filtering checkpoints based on user specified characteristics to identify checkpoints that are desirable to the client, wherein the checkpoints are of a primary file system;
    generating code for generating a result set of recovery checkpoints having one or more of the characteristics;
    merging code for merging the resultant set of recovery checkpoints into a set of virtual directories placed directly within the primary file system; and
    upon the occurrence of a trigger event, updating the virtual directories associated with the trigger event.

22. The computer device of claim 21 wherein the filtering code includes code for performing absolute and relative filtering.

23. The computer device of claim 21 wherein the program code includes means for dynamically building a result set of available checkpoints for a directory.

24. The computer device of claim 21 wherein the set of virtual directories are arranged into a virtual checkpoint hierarchy.

* * * * *